United States Patent
Ross et al.

(10) Patent No.: US 10,628,372 B2
(45) Date of Patent: **\*Apr. 21, 2020**

(54) INTERNAL SERIAL INTERFACE

(71) Applicant: Skyworks Solutions, Inc., Woburn, MA (US)

(72) Inventors: James Henry Ross, Cedar Rapids, IA (US); Matthew Lee Banowetz, Marion, IA (US)

(73) Assignee: Skyworks Solutions, Inc., Woburn, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/271,441

(22) Filed: Feb. 8, 2019

(65) Prior Publication Data

US 2019/0272251 A1 Sep. 5, 2019

Related U.S. Application Data

(63) Continuation of application No. 15/280,768, filed on Sep. 29, 2016, now Pat. No. 10,248,612.

(60) Provisional application No. 62/235,277, filed on Sep. 30, 2015.

(51) Int. Cl.
*G06F 3/00* (2006.01)
*G06F 13/42* (2006.01)
*G06F 13/40* (2006.01)

(52) U.S. Cl.
CPC ...... *G06F 13/4291* (2013.01); *G06F 13/4022* (2013.01); *G06F 13/4286* (2013.01); *Y02D 10/14* (2018.01); *Y02D 10/151* (2018.01)

(58) Field of Classification Search
CPC .................................................... G06F 3/00
See application file for complete search history.

(56) References Cited

U.S. PATENT DOCUMENTS

| | | | |
|---|---|---|---|
| 8,521,101 | B1 | 8/2008 | Kadam |
| 8,023,909 | B2 | 9/2011 | Ripley et al. |
| 8,526,995 | B2 | 9/2013 | Ripley et al. |
| 8,666,337 | B2 | 3/2014 | Ripley et al. |
| 8,688,865 | B2 | 4/2014 | Luo |
| 8,791,719 | B2 | 7/2014 | Ripley |
| 8,983,409 | B2 | 3/2015 | Ngo |
| 9,189,430 | B2 | 11/2015 | Ross et al. |
| 9,355,054 | B2 | 5/2016 | Wu |
| 9,413,313 | B2 | 8/2016 | Banowetz et al. |

(Continued)

FOREIGN PATENT DOCUMENTS

| | | |
|---|---|---|
| CN | 101807375 A | 8/2010 |
| CN | 105446919 A | 3/2016 |

OTHER PUBLICATIONS

Chinese Office Action in Application No. CN201610873322.6, dated Jul. 26, 2019 in 10 pages. (English translation included).

*Primary Examiner* — Cheng Yuan Tseng
(74) *Attorney, Agent, or Firm* — Knobbe, Martens, Olson & Bear, LLP

(57) ABSTRACT

A simplified serial interface for a communications device. The serial interface includes an RF front end and a transmit block and at least one receive block located on different dies. The receive block is activated by a clock generator that is separate than the system clock. The at least one receive block can inhibit transmission of an enable signal to the receive block and inhibit operation of an oscillator of the interface.

19 Claims, 6 Drawing Sheets

(56) References Cited

U.S. PATENT DOCUMENTS

| | | |
|---|---|---|
| 9,473,076 B2 | 10/2016 | Ni et al. |
| 9,519,612 B2 | 12/2016 | Hietala |
| 9,606,947 B2 | 3/2017 | Ross et al. |
| 9,634,619 B2 | 4/2017 | Gerard et al. |
| 9,698,853 B2 | 7/2017 | Andrys et al. |
| 9,703,737 B2 | 7/2017 | Bagger |
| 9,720,872 B2 | 8/2017 | Southcombe |
| 9,722,771 B2 | 8/2017 | Banowetz et al. |
| 9,774,307 B2 | 9/2017 | Banowetz et al. |
| 9,774,716 B2 | 9/2017 | Young et al. |
| 9,817,782 B2 | 11/2017 | Leitner |
| 9,917,938 B2 | 3/2018 | Young et al. |
| 9,935,588 B2 | 4/2018 | Ni et al. |
| 9,971,717 B2 | 5/2018 | Tsujita |
| 10,033,336 B2 | 7/2018 | Banowetz et al. |
| 10,248,612 B2 * | 4/2019 | Ross .................. G06F 13/4291 |
| 2010/0178960 A1 | 7/2010 | Ripley et al. |
| 2011/0218020 A1 | 9/2011 | Ripley et al. |
| 2012/0071118 A1 | 3/2012 | Ripley et al. |
| 2012/0185623 A1 | 7/2012 | Ross et al. |
| 2014/0173158 A1 | 6/2014 | Valcore, Jr. |
| 2015/0038092 A1 | 2/2015 | Andrys et al. |
| 2015/0133186 A1 | 5/2015 | Banowetz et al. |
| 2015/0171797 A1 | 6/2015 | Ni et al. |
| 2015/0349715 A1 | 12/2015 | Gerard et al. |
| 2016/0117275 A1 | 4/2016 | Ross et al. |
| 2016/0191138 A1 | 6/2016 | Kianush et al. |
| 2016/0242057 A1 | 8/2016 | Ripley et al. |
| 2017/0003733 A1 | 1/2017 | Banowetz |
| 2017/0026136 A1 | 1/2017 | Thompson et al. |
| 2017/0040962 A1 | 2/2017 | Banowetz et al. |
| 2017/0091143 A1 | 3/2017 | Ross et al. |
| 2017/0093559 A1 | 3/2017 | Banowetz et al. |
| 2017/0124008 A1 | 5/2017 | Chen et al. |
| 2017/0133987 A1 | 5/2017 | Ni et al. |
| 2017/0187334 A1 | 6/2017 | Banowetz et al. |
| 2017/0187857 A1 | 6/2017 | Young et al. |
| 2017/0192933 A1 | 7/2017 | Banowetz et al. |
| 2017/0228332 A1 | 8/2017 | Ross et al. |
| 2017/0294880 A1 | 10/2017 | Gerard et al. |
| 2017/0374183 A1 | 12/2017 | Young et al. |
| 2018/0019772 A1 | 1/2018 | Banowetz et al. |
| 2018/0260358 A1 | 9/2018 | Obkircher et al. |

* cited by examiner

INTERNAL SERIAL INTERFACE

CROSS-REFERENCE TO RELATED APPLICATIONS

This application is a continuation of U.S. application Ser. No. 15/280,768 filed Sep. 29, 2016 and titled "INTERNAL SERIAL INTERFACE," which claims the benefit of priority under 35 U.S.C. § 119(e) of U.S. Provisional Patent Application No. 62/235,277, filed Sep. 30, 2015 and titled "INTERNAL SERIAL INTERFACE," which is herein incorporated by reference in its entirety.

BACKGROUND

Field of the Invention

Embodiments of the invention relate to electronic systems, and in particular, to serial interfaces for electronic communication devices and systems.

Description of the Related Technology

Radio frequency front ends (RFFE) used in conjunction with devices such as smart phones, tablets, computers and the like are increasingly required to have more control states that further require the control of additional peripheral or downstream devices. Typically, the added control states for controlling additional peripheral devices are accomplished using standard general purpose input and output (GPIO) interfaces or a standard serial MIPI RFFE type interface.

However, these interfaces can consume a significant amount of resources of an IC. For example, increasing the amount of GPIO signals requires more use of area on the master and slave dies for wire bond connections. This issue is particularly problematic with flip chip style dies. Moreover, this approach further results in greater routing size and complexity issues and can also result in corruption of the GPIO signals by the RF signals.

Similarly, using established MIPI RFFE type serial interfaces is also problematic as adding this complex interface to each of the peripherals increases die complexity and will result in redundant circuitry on different peripheral devices within the module which can increase costs. Further, the routing of MIPI RFFE interface signals to multiple devise within a module can add a signal aggressor that can cause RF performance issues which further adds to routing complexity issues.

There is a need for improved serial interfaces. Furthermore, there is a need for slave devices for serial interfaces that consume less routing resources, and which do not require additional slave addresses, register mapping tables, and/or pins.

SUMMARY

In one implementation, the aforementioned needs are addressed by a communications interface device comprising: a radio frequency front end (RFFE) that receives input data signals and a first clock signal; a serial interface that receives data signals from the RFFE and includes a transmit block that provides data and enable signals to at least one receive block, the receive block being associated with a component other than the RFFE; and a clock generator that is enabled by the RFFE to provide a second clock signal when data is to be transmitted via the interface so that the serial interface transmit block receives the second clock signal.

In some embodiments of this implementation, the at least one receive block includes a plurality of receive blocks that receive data signals, enable signals and clock signals from the at least one transmit block.

In some embodiments of this implementation, the plurality of receive blocks receive a common enable signal.

In some embodiments of this implementation, the plurality of receive blocks are individually enabled by the transmit block.

In some embodiments of this implementation, the clock generator is activated by the RFFE when data is received by the RFFE indicates that the data being provided to the at least one receive block has changed.

In some embodiments of this implementation, the clock generator provides a clock signal and a transmit signal to the transmit block of the interface when enabled by the RFFE.

In some embodiments of this implementation, the clock generator and the transmit block are disabled when the data has been transmitted.

In some embodiments of this implementation, the device further comprises a downstream device that receives the data from the at least one receive block.

In some embodiments of this implementation, the downstream device includes an antenna switch module or a band switch.

In some embodiments of this implementation, the RFFE and the transmit block are formed on a first die, and the at least one receive block and downstream device are formed on a second die.

In some embodiments of this implementation, the downstream device includes a detector that determines when the receive block and downstream device is capable of receiving the data from the receive block and the downstream device communicates with the receive block to inhibit enablement of the receive block until the receive unit and downstream device is capable of receiving data.

In some embodiments of this implementation, the downstream device includes a power on reset (POR) detector, and the enable line of the receive block has a switch enabled pull down resistor that inhibits transmission of the enable signal.

In another implementation, the aforementioned needs are addressed by a communications device comprising: a radio frequency front end (RFFE) that receives input data signals and a first clock signal; a serial interface that receives data signals from the RFFE and includes a transmit block that provides data and enable signals to at least one receive block, the at least one receive block being associated with a component other than the RFFE; and a downstream device that receives the data from the at least one receive block, the downstream device including a detector that determines when the at least one receive block and downstream device are capable of receiving the data from the at least one receive block, the downstream device configured to communicate with the at least one receive block to inhibit enablement of the receive block until the receive block and downstream device are capable of receiving data.

In some embodiments of this implementation, the communications device further comprises a clock generator that is enabled by the RFFE to provide a second clock signal to the serial interface transmit block when data is to be transmitted via the interface.

In some embodiments of this implementation, the clock generator provides a clock signal and a transmit signal to the transmit block of the interface when enabled by the RFFE.

In some embodiments of this implementation, the clock generator and the transmit block are disabled when the data has been transmitted.

In some embodiments of this implementation, the at least one receive block includes a plurality of receive blocks that receive data signals, enable signals and clock signals from the at least one transmit block.

In some embodiments of this implementation, the plurality of receive blocks receive a common enable signal.

In some embodiments of this implementation, the plurality of receive blocks are individually enabled by the transmit block.

In some embodiments of this implementation, the downstream device includes an antenna switch module or a band switch.

In some embodiments of this implementation, the RFFE and the transmit block are formed on a first die, and the at least one receive block and downstream device are formed on a second die.

In some embodiments of this implementation, the downstream device includes a power on reset (POR) detector, and the enable line of the receive block has a switch enabled pull down resistor that inhibits transmission of the enable signal.

DETAILED DESCRIPTION OF EMBODIMENTS

The headings provided herein, if any, are for convenience only and do not necessarily affect the scope or meaning of the claimed invention.

Provided herein are various non-limiting examples of devices and methods for use with serial interfaces.

Figure 1:
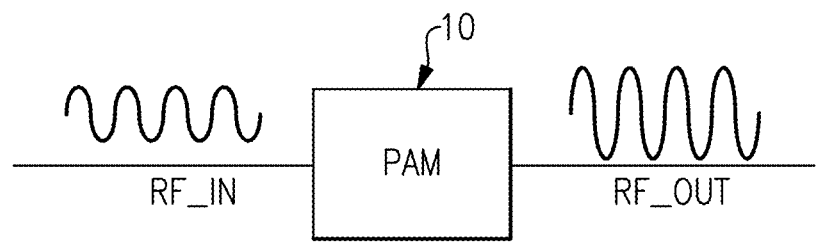
FIG. 1 is a schematic diagram of a power amplifier module for amplifying a radio frequency (RF) signal.

FIG. 1 is a schematic diagram of a power amplifier module for amplifying a radio frequency (RF) signal. The illustrated power amplifier module (PAM) 10 can be configured to amplify an RF signal IN to generate an amplified RF signal OUT. As described herein, the power amplifier module can include one or more power amplifiers.

RF power amplifiers can be used to boost the power of a RF signal having a relatively low power. Thereafter, the boosted RF signal can be used for a variety of purposes, included driving the antenna of a transmitter.

Power amplifiers can be included in mobile phones to amplify a RF signal for transmission. For example, in mobile phones having a time division multiple access (TDMA) architecture, such as those found in Global System for Mobile Communications (GSM), code division multiple access (CDMA), and wideband code division multiple access (W-CDMA) systems, a power amplifier can be used to amplify a RF signal. It can be important manage the amplification of a RF signal, as a desired transmitted power level can depend on how far the user is away from a base station and/or the mobile environment. Power amplifiers can also be employed to aid in regulating the power level of the RF signal over time, so as to prevent signal interference from transmission during an assigned receive time slot.

The power consumption of a power amplifier can be an important consideration. One technique for reducing power consumption of a power amplifier is envelope tracking, in which the voltage level of the power supply of the power amplifier is varied in relation to the envelope of the RF signal. Thus, when the envelope of the RF signal increases, the voltage supplied to the power amplifier can be increased. Likewise, when the envelope of the RF signal decreases, the voltage supplied to the power amplifier can be decreased to reduce power consumption.

Figure 2:
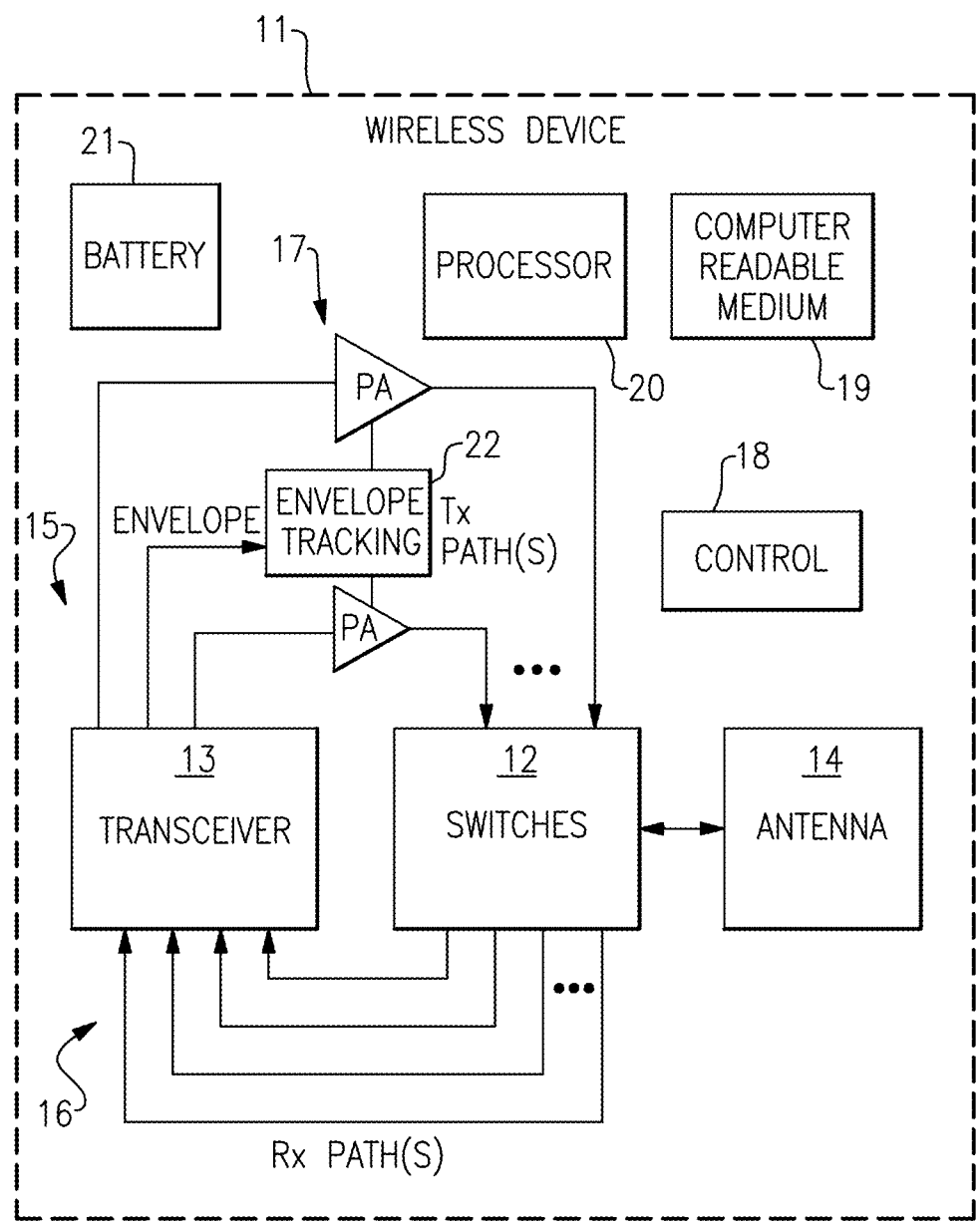
FIG. 2 is a schematic block diagram of an example wireless device that can include one or more of the power amplifier modules of FIG. 1.

FIG. 2 is a schematic block diagram of an example wireless device 11 that can include one or more of the power amplifier modules of FIG. 1. The wireless device 11 can include serial interfaces implementing one or more features of the present disclosure.

The example wireless device 11 depicted in FIG. 2 can represent a multi-band and/or multi-mode device such as a multi-band/multi-mode mobile phone. By way of examples, Global System for Mobile (GSM) communication standard is a mode of digital cellular communication that is utilized in many parts of the world. GSM mode mobile phones can operate at one or more of four frequency bands: 850 MHz (approximately 824-849 MHz for Tx, 869-894 MHz for Rx), 900 MHz (approximately 880-915 MHz for Tx, 925-960 MHz for Rx), 1800 MHz (approximately 1710-1785 MHz for Tx, 1805-1880 MHz for Rx), and 1900 MHz (approximately 1850-1910 MHz for Tx, 1930-1990 MHz for Rx). Variations and/or regional/national implementations of the GSM bands are also utilized in different parts of the world.

Code division multiple access (CDMA) is another standard that can be implemented in mobile phone devices. In certain implementations, CDMA devices can operate in one or more of 800 MHz, 900 MHz, 1800 MHz and 1900 MHz bands, while certain WCDMA and Long Term Evolution (LTE) devices can operate over, for example, about 22 radio frequency spectrum bands.

One or more features of the present disclosure can be implemented in the foregoing example modes and/or bands, and in other communication standards. For example, 3G and 4G are non-limiting examples of such standards.

In certain embodiments, the wireless device 11 can include a switching component 12, a transceiver component 13, an antenna 14, power amplifiers 17, a control component 18, a computer readable medium 19, a processor 20, a battery 21, and envelope tracking block 22.

The transceiver component 13 can generate RF signals for transmission via the antenna 14. Furthermore, the transceiver component 13 can receive incoming RF signals from the antenna 14.

It will be understood that various functionalities associated with the transmission and receiving of RF signals can be achieved by one or more components that are collectively represented in FIG. 2 as the transceiver 13. For example, a single component can be configured to provide both transmitting and receiving functionalities. In another example, transmitting and receiving functionalities can be provided by separate components.

Similarly, it will be understood that various antenna functionalities associated with the transmission and receiving of RF signals can be achieved by one or more components that are collectively represented in FIG. 1B as the antenna 14. For example, a single antenna can be configured to provide both transmitting and receiving functionalities. In another example, transmitting and receiving functionalities can be provided by separate antennas. In yet another example, different bands associated with the wireless device 11 can be provided with one or more antennas.

In FIG. 2, one or more output signals from the transceiver 13 are depicted as being provided to the antenna 14 via one or more transmission paths 15. In the example shown, different transmission paths 15 can represent output paths associated with different bands and/or different power outputs. For example, two example power amplifiers 17 shown can represent amplifications associated with different power output configurations (e.g., low power output and high power output), and/or amplifications associated with different bands.

In FIG. 2, one or more detected signals from the antenna 14 are depicted as being provided to the transceiver 13 via one or more receiving paths 16. In the example shown, different receiving paths 16 can represent paths associated with different bands. For example, the four example paths 16 shown can represent quad-band capability that some wireless devices are provided with.

To facilitate switching between receive and transmit paths, the switching component 12 can be configured to electrically connect the antenna 14 to a selected transmit or receive path. Thus, the switching component 12 can provide a number of switching functionalities associated with an operation of the wireless device 11. In certain embodiments, the switching component 12 can include a number of switches configured to provide functionalities associated with, for example, switching between different bands, switching between different power modes, switching between transmission and receiving modes, or some combination thereof. Various non-limiting examples of such switches are described herein in greater detail. The switching component 12 can also be configured to provide additional functionality, including filtering of signals. For example, the switching component can be a front-end module for a transceiver, and can include one or more duplexers.

FIG. 2 shows that in certain embodiments, a control component 18 can be provided and such a component can be configured to provide various control functionalities associated with operations of the switching component 12, the power amplifiers 17, the envelope tracking block 22, and/or other operating component(s). Non-limiting examples of the control component 18 are described herein in greater detail.

In certain embodiments, a processor 20 can be configured to facilitate implementation of various processes described herein. For the purpose of description, embodiments of the present disclosure may also be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flowchart and/or block diagram block or blocks.

In certain embodiments, these computer program instructions may also be stored in a computer-readable memory 19 that can direct a computer or other programmable data processing apparatus to operate in a particular manner, such that the instructions stored in the computer-readable memory produce an article of manufacture including instruction means which implement the acts specified in the flowchart and/or block diagram block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide steps for implementing the acts specified in the flowchart and/or block diagram block or blocks.

The illustrated wireless device 11 also includes the envelope tracking block 22, which can be used to provide a power supply to one or more of the power amplifiers 17. For example, the enveloping tracking block 22 can vary the supply voltage provided to the power amplifiers 17 based upon an envelope of the RF signal to be amplified.

The envelope tracking block 22 can be electrically connected to a battery 21, and the envelope tracking block 22 can be configured to vary the voltage provided to the power amplifiers 17 based on an envelope of the RF signal to be amplified. The battery 21 can be any suitable battery for use in the wireless device 11, including, for example, a lithium-ion battery. By varying the voltage provided to the power amplifiers, the power consumption of the battery 21 can be reduced, thereby improving performance of the wireless device 11. The envelope signal can be provided to the envelope tracking block 22 from the transceiver 13. However, the envelope can be determined in other ways. For example, the envelope can be determined by detecting the envelope from the RF signal using any suitable envelope detector.

Figure 3:
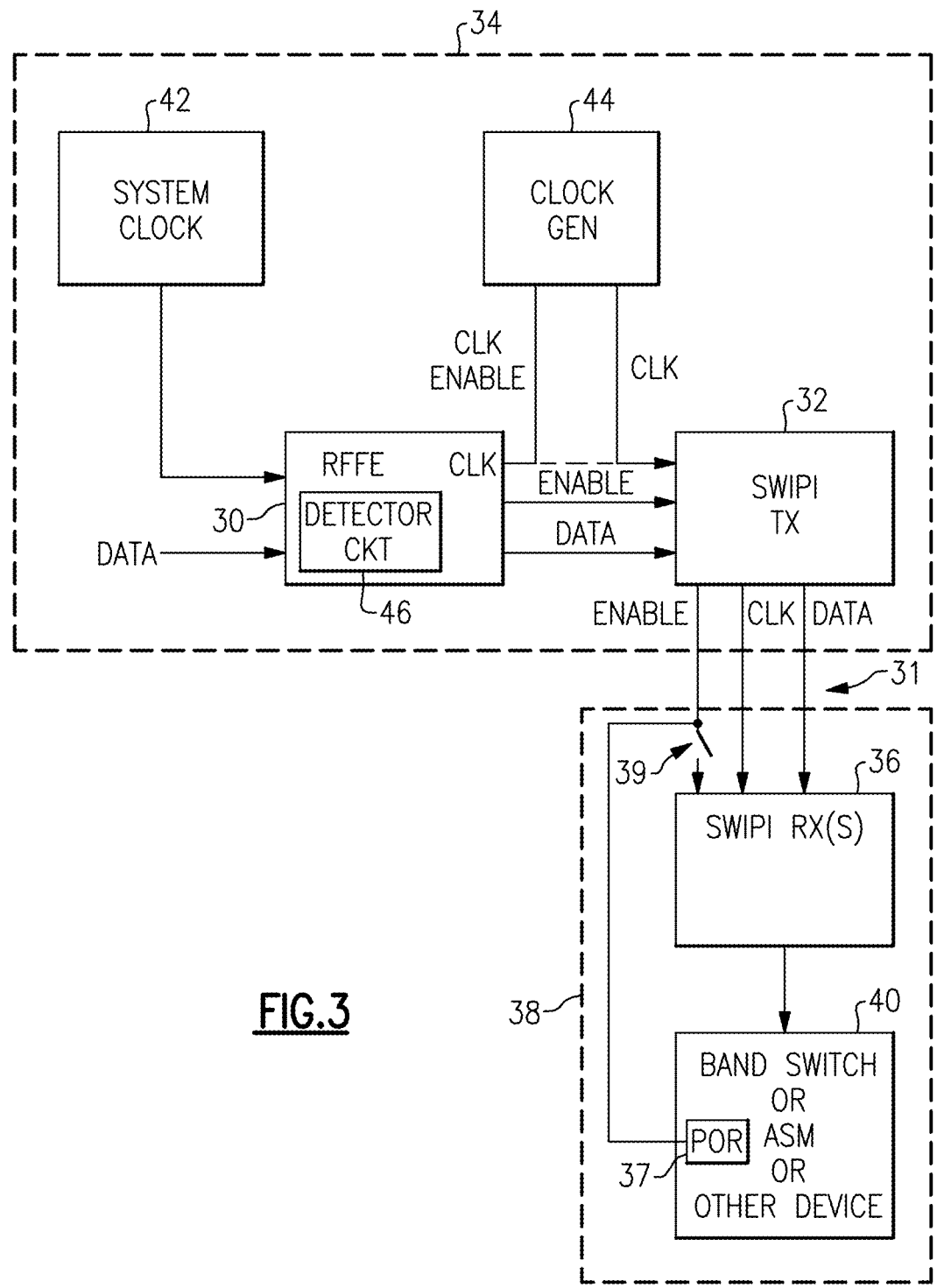
FIG. 3 is a schematic block diagram of an electronic system including a serial interface.

FIG. 3 is a functional block diagram of a portion of a communications device having radio frequency front end RFFE 30 interface 31 and downstream or peripheral devices 40 that can be implemented in the wireless device 11 of FIG. 2. As is understood, various signals may need to be transmitted from a controller die 34 such as a controller die for the power amplifiers 17 etc. to peripheral devices such as band switches, antenna switch monitors (ASMs), low noise amplifiers, or other CMOS controllers etc. As discussed above, using GPIO interfaces or MIPI REFE serial interfaces can be disadvantageous due to space, routing and cost concerns. FIG. 3 illustrates the communications device in a functional sense and various components of the RFFE may be implemented in both hardware, software, firmware, or some combination thereof and may be portions of the control 18, the processor 20, and the transceiver 13 of the wireless device of FIG. 2.

The embodiment shown in FIG. 3 contemplates using a simplified serial interface 31 that has an enable line ENABLE, a clock line CLK and a data line DATA that transmit between a local serial transmit block SWIPI TX 32 on a first die 34 to one or more local serial receive block SWIPI RX 36 on a second die 38. The receive block 36 provides the data to a downstream or peripheral device 40 such as a band switch or an antenna switch module or some other device. In this way, data that is received by the RFFE 30 can be supplied to downstream devices 40, often located on different dies, using a simplified three wire serial interface. It will be appreciated that using a simplified serial interface can reduce the size of the die 34 as a result of fewer control pads.

The RFFE 30 receives data signals from the antenna 14 via the switches 12 and transceiver 13 and certain ones of these data signal may selected for transmission to the downstream devices 40. The RFFE 30 also preferably receives a clock signal from a system clock 42 that may be a function of the processor 20 or the control block 18. However, as shown in FIG. 3, the local serial interface transmitter 32 receives a separate clock signal from a clock generator 44 that is enabled by the RFFE 30. In this way, the local serial interface 31 can avoid some possible sources of corruption from the primary interface. As will be discussed below, the clock generator 44 is preferably enabled when data is going to be transmitted across the local serial interface 31.

The RFFE 30 also preferably includes a change detection circuit 46 that detects when changes in the data signals that are received by the RFFE have been changed. As will be discussed in greater detail below, the RFFE 30 in some implementations provides updated DATA signals across the interface 31 only when the incoming data signals have changed or when a reset or trigger type of signal has been received. This can result in significant power saving and extend battery life.

In one implementation, the transmit block 31 monitors the voltage of the ENABLE signal going to the receive block and only transmits data via the DATA line when the ENABLE signal is above a pre-selected threshold. As shown in FIG. 3, the downstream device 40 and/or the receive block 36 may include a detector such as power on reset (POR) switch 37 that determines if the receive block 36 and/or the downstream device is in a steady state to receive the data signals via the interface. The ENABLE line of the interface 31 may include a switch device 39 that, in one implementation comprise a pull down resistor, that is controlled by the detector that maintains the ENABLE signal below the threshold voltage until the detector 37 determines that the receive block and/or downstream device is ready to receive the data.

In this implementation, the transmit block 32 transmits the data via an oscillated signal. The transmit block 32 can be programmed to inhibit the operation of the oscillator until the transmit block 32 determines that the ENABLE line of the interface 31 has reached a threshold voltage. In this way, transmission of the DATA can be achieved when the receive block 36 and/or the downstream device 40 are in condition for reception of the DATA. This feedback can be provided across the interface 31 without the transmission of an additional duplex signal across the interface and requires no additional lines thereby making the interface simpler.

Figure 4A:
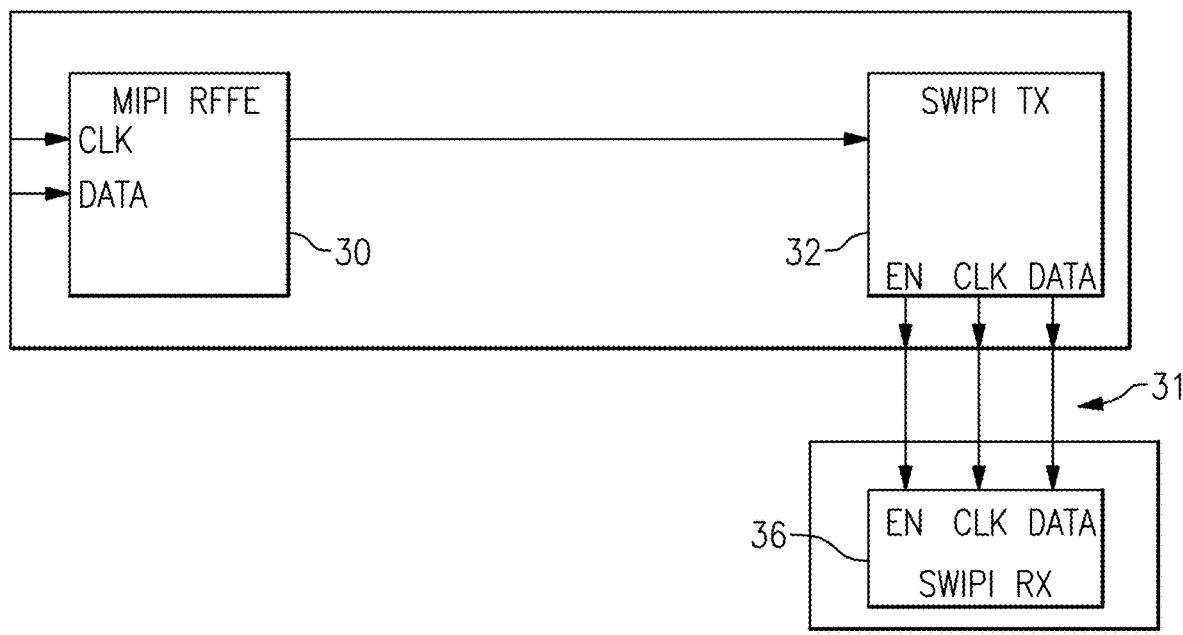
FIGS. 4A-4C are schematic block diagrams illustrating a plurality of different possible implementations of the electronic system of FIG. 3.
Figure 4B:
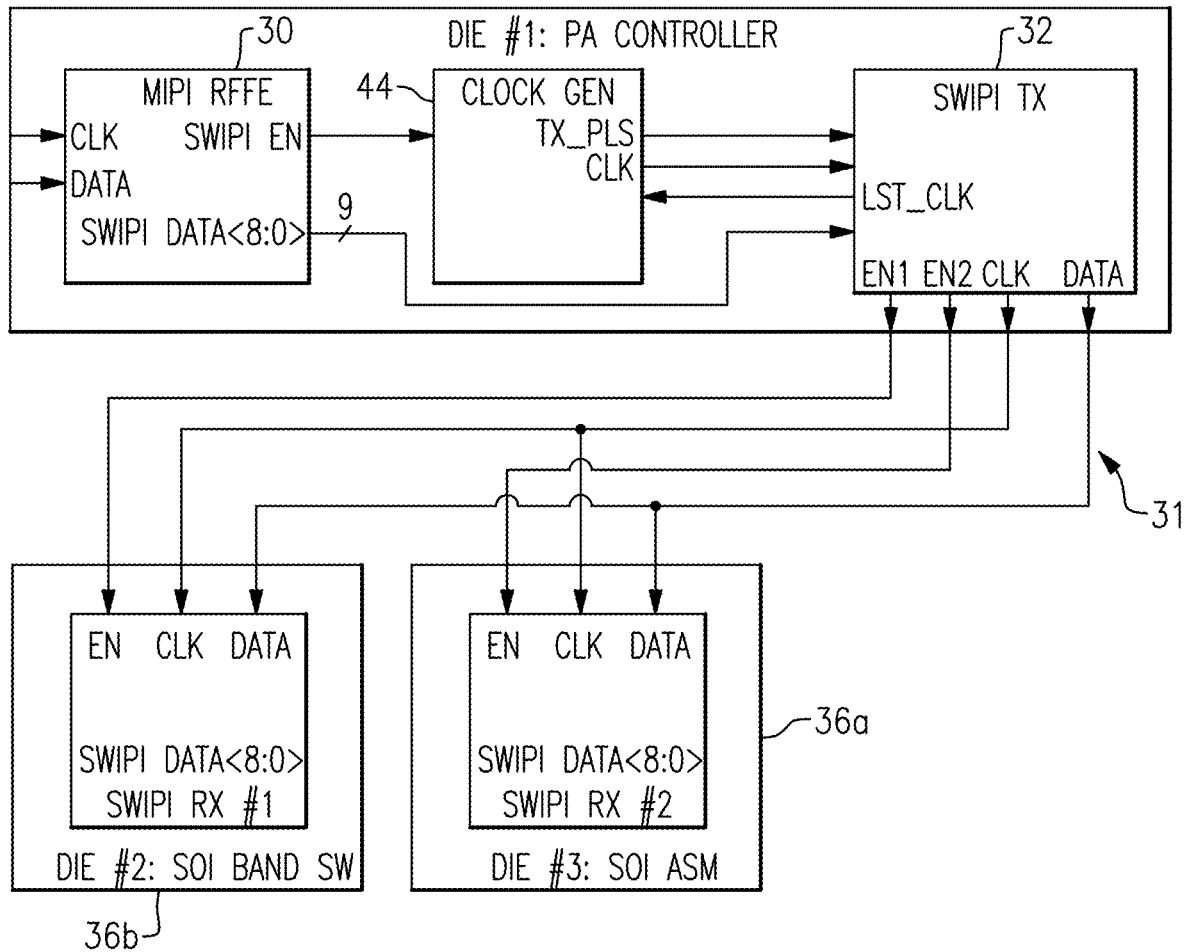
Figure 4C:
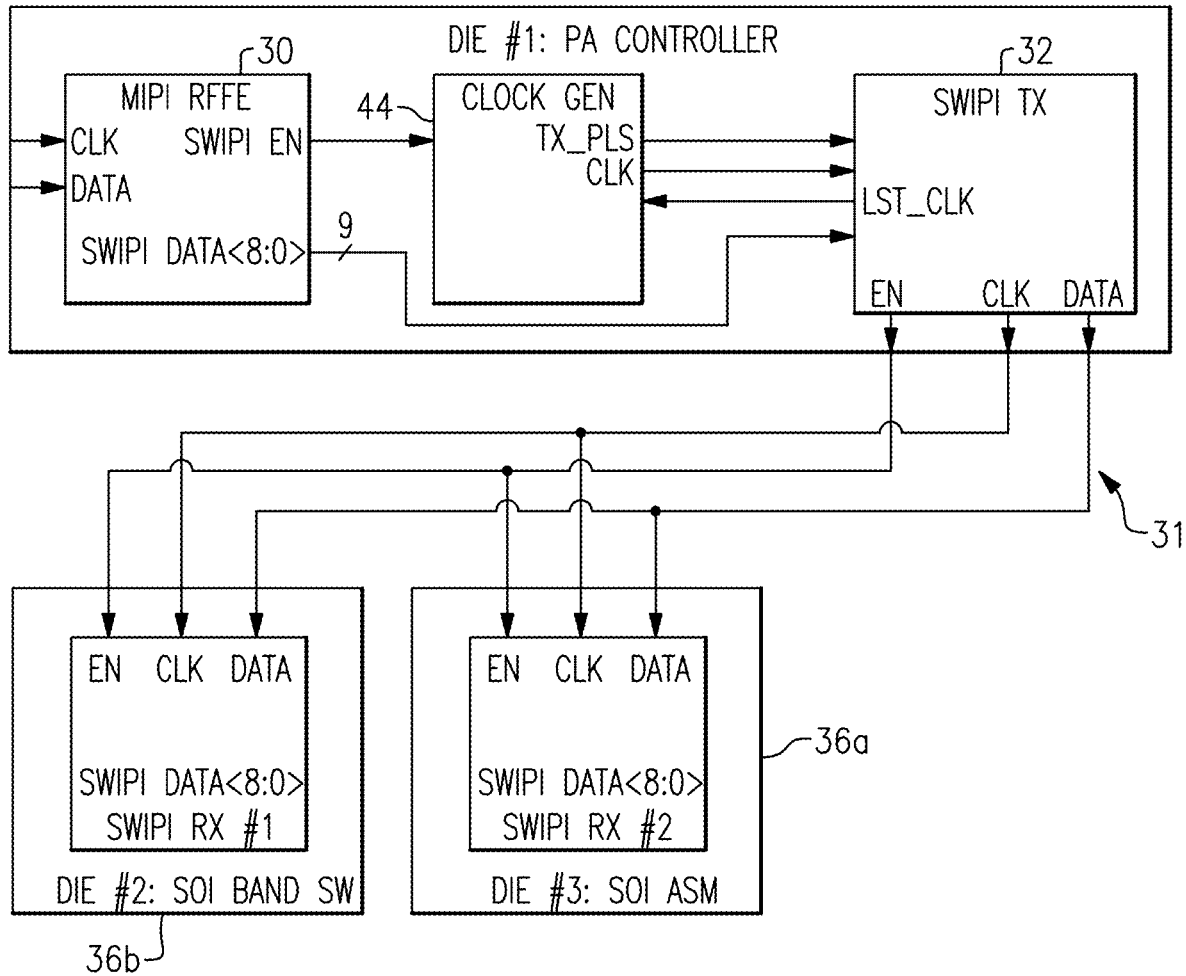

FIGS. 4A-4C illustrate various possible implementations of the RFFE 30 with the local serial interface 31. In FIG. 4A, the RFFE 30 provides signals directly to the local serial transmit block 32 and the transmit block 32 provides data, clock and enable signals to the local serial receiver 36 for subsequent use by downstream components. The RFFE 30 is preferably providing the data signal for the local transmit block 32, an enable signal and a clock signal. As discussed above, the clock signal can in some implementations be a separate clock signal than the master clock signal being used by the RFFE. However, it will be appreciated that in some implementations a master clock signal may also be provided either by the RFFE or independently to the local serial transmit block 32. In the implementation of FIG. 4A, a single receive block 36 receives the signals from the transmit block 32 via the interface 31. It will, however, be appreciated that multiple blocks may be receiving the same signals.

FIG. 4B illustrates another implementation of the interface 31 where the interface 31 is interposed between a first die 34 that comprises a power amplifier controller and a second and third dies which also comprise a band switch and an antenna switch module (ASM). In this implementation, RFFE 30 provides an enable signal to the clock generator 44 which then provides a clock signal to the transmit block 32 and transmit enable signal to the transmit block 32. The transmit block 32 in this implementation has two enable signals EN1, EN2 that allows the DATA signal to be selectively provided to either one of the receive blocks 36a, 36b or both of the receive blocks 36a, 36b.

Based upon the DATA being received by the RFFE 30, the RFFE 30 can select the downstream destination of the DATA to the appropriate receives block 36a, 36b. The transmit block 32 in this implementation, also provides a clock signal derived from the clock signal provided by the clock generator 44 to the receive blocks 36a, 36b. As is also shown in FIG. 4B, the transmit block 32 may also have the functionality to provide a lost clock signal LST_CLK back to the clock generator 44 when the transmit block 32 detects that it no longer receives the clock signal CLK from the clock generator 44.

The transmit block 32 provides a clock signal CLK and a data signal DATA to one or more of a plurality of receive blocks 36a, 36b. It will be appreciated that while two receive blocks 32 are shown in FIG. 4B, that any number of receive blocks can be implemented with the interface 31 without departing from the spirit or scope of the present disclosure. In this implementation, there is a separate enable signal EN1 and EN2 for each of the receive blocks 36a, 36b which permits the RFFE 30 to be able to selectively enable the receive block 36a, 36b to receive the data that is being passed by the interface 31. In this implementation, the receive block 31a provides signals to a band switch and the receive block 32b provides signals to an antenna switch module (ASM) but it will be appreciated that any number of different devices can be used to receive the data via the serial interface 31 without departing from the spirit or scope in the instant application.

FIG. 4C illustrates another embodiment of the interface 31. In this embodiment, the transmit block 32 provides a single enable signal EN to both of the receive blocks 36a, 36b. It will be appreciated that some information can be transmitted simultaneously to two different elements and to simplify the interface, it may be desirable to having a single enable line being provided to multiple receive blocks. It will be further appreciated that there may be combined enable signals and discrete enable signals in the interface 31 going to different receive blocks without departing from the scope of the present teachings.

Figure 5:
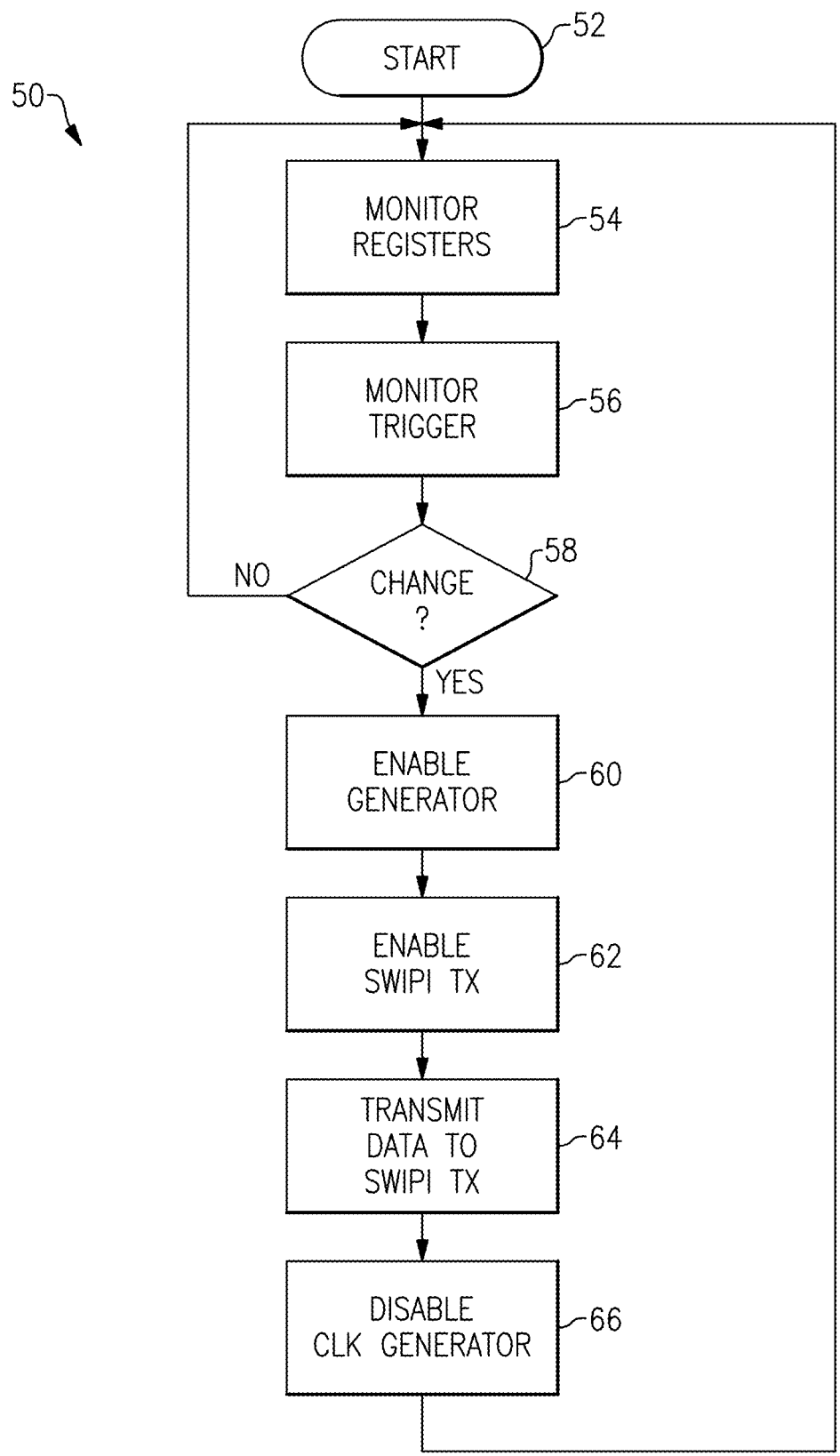
FIG. 5 is an exemplary flow chart that illustrates a sample operation of the system of FIG. 3.

FIG. 5 is a flow chart that illustrates an exemplary manner of operation of the RFFE 30 and the interface 31. In one implementation, the system provides updated signals via the interface 31 when signals are received by the RFFE 30. The signals may be received via a number of different interfaces including GPIO or MEPE serial interfaces. In one implementation, the RFFE 30 includes the change detector 46 that determines whether the state of various registers has changed. The registers can comprise specifically identified registers in the RFFE of data signals that are to be sent to the receive blocks 36 via the interface 31. Preferably, the RFFE 30 induces the signals to be sent whenever the values in the registers change or when a general reset signal is received by the RFFE 30. As shown, the RFFE 30 monitors the designated registers for changes in state 54 and also whether there is a reset trigger in state 56.

If the RFFE 30 determines that there is a change in decision state 58, the RFFE 30 then enables the clock generator 44 in state 58 and further enables the transmit block 32 in state 62. Once the clock generator 44 is providing a clock signal to the transmit block 32 and the transmit block 32 is enabled, data received by the RFFE can be transmitted to the transmit block 64. This data will be transmitted to the receive blocks 36 via the interface 31. As discussed above, the transmit block 32 can be configured to send global enable signals to the receive blocks or individual enable signals or some combination thereof. When the transmit block 32 is providing individualized enable signals, this information can be transmitted from the RFFE to the transmit block 32 as part of the data.

Once the data has been sent, the RFFE can disable the clock generator in state 66 which can then disable the transmit block 32. In this way, power savings can be achieved as a result of only powering the interface 31 when data is to be transmitted. Moreover, by having a clock generator 44 that is separate from the clock generator of the overall system, the likelihood of corruption between the signals is reduced. Further, the system may be configured in some implementations such that the interface 31 and its associated components are held in a low state until data is to be transmitted.

In one implementation, the interface 31 provides 9 bits of control for implementations such as an ASM and BSW in the manner illustrated. It will, however, be appreciated that the command length is adjustable based upon the implementation. It will also be appreciated that the timing of the transmission of the data signals may also require that the receive blocks 36 and the associated devices be enabled and in a stable state before transmission. In one implementation shown in FIG. 6, the device may include a POR circuit Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A communications interface for a radio frequency device, comprising:
   a serial interface configured to receive data signals from a radio frequency front end component, the serial interface including a transmit block configured to provide data signals to at least one receive block; and
   a clock generator configured to be activated to provide a first clock signal to the serial interface when first data received by the serial interface from the radio frequency front end component is to be transmitted via the serial interface to the receive block, the first clock signal being different than a second clock signal provided to the radio frequency front end component, the clock generator and the transmit block being configured to be disabled when the first data has been transmitted via the serial interface.

2. The communications interface of claim 1 wherein the at least one receive block includes a plurality of receive blocks configured to receive data signals, enable signals, and clock signals from the serial interface.

3. The communications interface of claim 2 wherein the plurality of receive blocks receive a common enable signal.

4. The communications interface of claim 2 wherein the plurality of receive blocks are individually enabled by the serial interface.

5. The communications interface of claim 1 further comprising a downstream device configured to receive the first data from the at least one receive block.

6. The communications interface of claim 5 wherein the downstream device includes an antenna switch module or a band switch.

7. The communications interface of claim 5 wherein the radio frequency front end component and the serial interface are formed on a first die, and the at least one receive block and downstream device are formed on a second die.

8. The communications interface of claim 5 wherein the downstream device includes a detector configured to determine when the receive block and downstream device are capable of receiving data and the downstream device communicates with the receive block to inhibit enablement of the receive block until the receive block and downstream device are capable of receiving data.

9. A wireless device, comprising:
a radio frequency front end component configured to receive input data signals and a first clock signal;
a serial interface configured to receive data signals from the radio frequency front end component and configured to provide data and enable signals to at least one receive block; and
a downstream device configured to receive the data from the at least one receive block and including a power on reset detector configured to determine when the at least one receive block and the downstream device are capable of receiving data, the power on reset detector controlling a switch that inhibits transmission of the enable signals until the at least one receive block and downstream device are capable of receiving data.

10. The device of claim 9 further comprising a clock generator configured to be enabled by the radio frequency front end component to provide a second clock signal to the serial interface when data is to be transmitted via the serial interface.

11. The device of claim 10 wherein the clock generator provides the second clock signal to the serial interface when enabled by the radio frequency front end.

12. The device of claim 11 wherein the clock generator is disabled when the data has been transmitted.

13. The device of claim 9 wherein the at least one receive block includes a plurality of receive blocks configured to receive data signals, enable signals, and clock signals from the serial interface.

14. The device of claim 13 wherein the plurality of receive blocks receive a common enable signal.

15. The device of claim 13 wherein the plurality of receive blocks are individually enabled by the serial interface.

16. The device of claim 9 wherein the downstream device further includes an antenna switch module or a band switch.

17. The device of claim 9 wherein the radio frequency front end and the serial interface are formed on a first die, and the at least one receive block and downstream device are formed on a second die.

18. The device of claim 9 wherein the switch includes at least one pull down resistor.

19. A wireless communications device comprising:
an antenna;
a radio frequency front end component coupled to the antenna; and
a communications interface including a serial interface configured to receive data signals from the radio frequency front end component, the serial interface including a transmit block configured to provide data signals to at least one receive block, the communications interface further including a clock generator configured to be activated to provide a first clock signal to the serial interface when first data received by the serial interface from the radio frequency front end component is to be transmitted via the serial interface to the receive block, the first clock signal being different than a second clock signal provided to the radio frequency front end component, the clock generator and the transmit block being configured to be disabled when the first data has been transmitted via the serial interface.

* * * * *